Dec. 2, 1941.                C. B. SEYMOUR                2,265,117
                       HYDRAULIC BRAKE LOCKOUT DEVICE
                            Filed Nov. 6, 1939
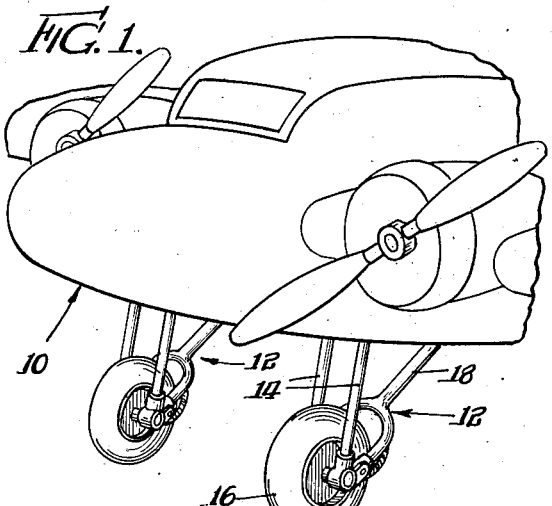
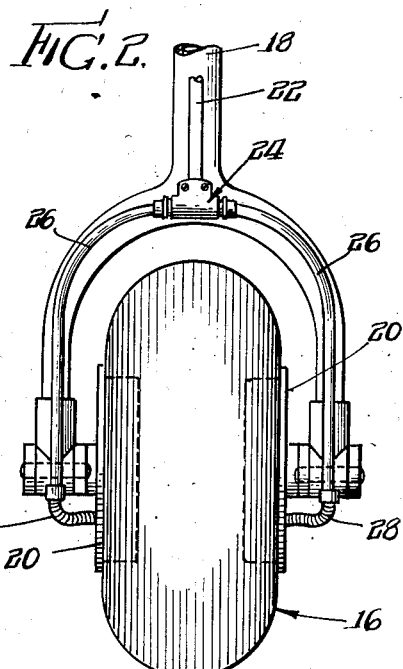
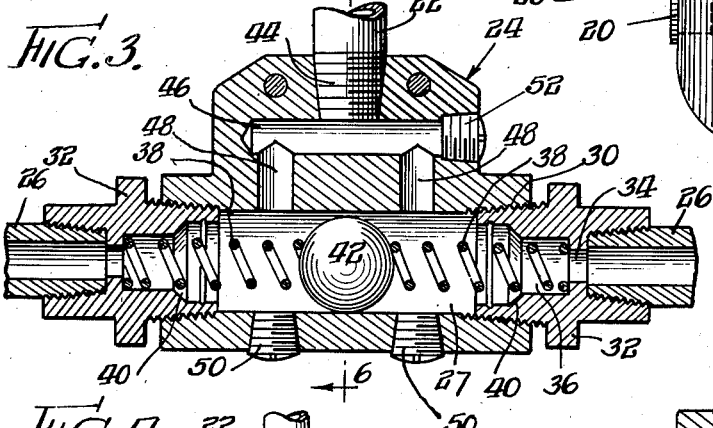
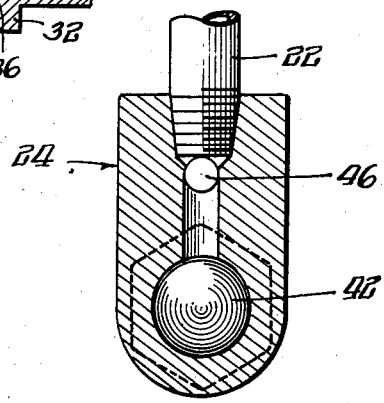
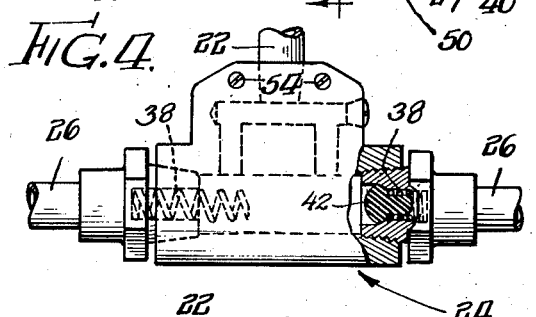
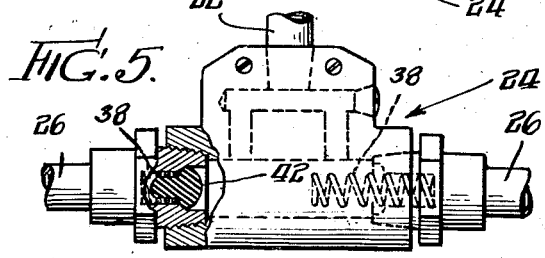
INVENTOR.
Clayton B. Seymour
BY Cox & Moore
ATTORNEYS.

Patented Dec. 2, 1941

2,265,117

UNITED STATES PATENT OFFICE 2,265,117

HYDRAULIC BRAKE LOCKOUT DEVICE

Clayton B. Seymour, Chicago, Ill., assignor to Hoof Products Company, Chicago, Ill., a corporation of Illinois Application November 6, 1939, Serial No. 302,960

10 Claims. (Cl. 303—84)

The present invention relates to the art of hydraulics and, more particularly, to a hydraulic lockout construction for facilitating the continued operation of multiple hydraulic systems despite leakage or failure of some part of the system.

While the present invention is applicable to a wide variety of hydraulic installations, the vehicular hydraulic brake is probably best illustrative of the application of the present invention. In such a device a plurality of brakes are operated from a single pressure source, the entire system instantly going out of operation, due to leakage or some equivalent defect in any brake line.

Early constructions to obviate this serious difficulty and maintain the system at least in partial operation in spite of the failure comprised what were in effect check valve devices in the several lines of the system adapted to operate when an abnormal flow of liquid occurred in the respective line to seal off that branch of the system. In the operation of this construction, however, the function of the cut-off valve is not reliable and it is apparent that, after considerable normal and expected operating wear, the increased flow may cause the valve to operate even though no failure occurs. If, however, the valve construction is made of sufficient capacity for such contingency, then the initial functioning may be undependable.

Subsequent constructions improved upon the foregoing by locating a single cut-off valve member in a surge chamber cooperable with a plurality of branch brake lines. In general, these constructions contemplated the provision of a cut-off member normally at a position adjacent a plurality of outlet ports and carried to lockout position by an abnormal flow of hydraulic fluid. One such device is exemplified by U. S. Patent No. 2,054,900. It is obvious that such constructions will function only in upright position which interferes seriously with practical application to any vehicular installation and positively prevents use in connection with air craft. A more serious deficiency, however, has arisen by virtue of the fact that the hydraulic systems must provide for the normal supply of widely varying degrees of flow to each of several branch lines. Thus, even in a braking system wherein brakes are adapted to apply the same degree of braking force, it is customary to completely renew only one of the brakes while another is considerably worn although in operative condition. It has been found that the foregoing lockout devices under such conditions may, and sometimes do, cause a failure by preferentially sealing off the line of relatively great flow, to wit, the conduit leading to the relatively worn braking unit.

It is an object of the present invention to obviate the foregoing problems by providing a hydraulic lockout device which is operative to positively and instantaneously cut off any branch conduit failing to sufficiently interfere seriously with the function of the remainder of the hydraulic system, which lockout device permits the system to remain in normal operation in spite of a wide disparity of hydraulic flow to each of the several branch conduits.

It is a further object of the present invention to provide a lockout device, as immediately above, in which a single unit is applicable to hydraulic systems of varied capacity; that is, it is not necessary, as heretofore, to carefully predetermine the size and capacity of the lockout unit in accordance with its particular application.

A yet further and important object of the present invention is to provide a lockout construction such as the foregoing which is operative on moving vehicles independently of the position or movement of the vehicle.

Yet other and further objects of the present invention will be more apparent from the following detailed description when considered in connection with the accompanying drawing, wherein:

Fig. 1 is a perspective view of a portion of an air craft illustrating the application of the present invention to the hydraulic brake system thereof.

Fig. 2 is a planned view taken beneath one of the landing wheels of the air craft upwardly.

Fig. 3 is a central, sectional view taken through the lockout device shown in Fig. 2.

Figs. 4 and 5 are planned views of the unit shown to a reduced scale and illustrating more or less diagrammatically the lockout action of the present construction.

Fig. 6 is a sectional view taken on the line 6—6 of Fig. 3.

Referring to the drawing, wherein the present invention is described more in detail, Figs. 1 and 2 show the more important commercial application thereof. The figures disclose an air craft 10 having conventional, retractable under-carriage constructions 12 comprising paired struts 14 mounting wheels 16 at the lower end and pivotally attached to the frame of the air craft at their upper portions so that the wheels and struts may be swung rearwardly and upwardly into retracted position by a forked arm 18 also pivotally associated with the axles of the wheels 16. In such constructions there is associated with each wheel 16 a pair of braking members 20, one disposed on either axial side of the central wheel flange, as clearly shown in Fig. 2. Each of the braking constructions 20 may comprise a cylindrical brake drum cooperating with a preferably internally expanding hydraulic brake shoe assembly.

Control of the brakes is effected through a main hydraulic line 22 leading to a lockout device 24 constructed in accordance with the present invention and located at the point of bifurcation of the forked strut 18, as clearly shown in Fig. 2. At this point branched conduits 26 lead along the forks of the strut 18 to the axle. Each of the branch conduits 26 terminates in a flexible hose communicating with each of the brake assemblies 20. The flexible conduits 28 may be, and have in the past been torn away, loosened, or otherwise caused to fail by repeated impact or conditions of unfavorable operating terrain with the result that the entire braking system instantly ceases to function. The lockout construction 24, in accordance with the present invention, retains either one of the brakes 20 in normal operation in spite of the failure of the companion brake. The construction of the lockout 24, illustrated more clearly in Figs. 3 and 6, comprises a block or casting provided with a central, longitudinally extending bore 27 internally threaded at its oppositely disposed extremities as at 30 to receive fittings 32. Each fitting is provided with a central conduit 34 threadedly receiving at its outer end one of the branch lines 26. In its oppositely facing direction each of the fittings is counterbored as at 36 providing a seat for the outer extremity of a helical compression spring 38. It should be particularly noted that just beyond the counterbored portion the central passage of each fitting flares as at 40 to provide what amounts to a valve seat cooperable with a movable valve member 42 within the central conduit 27. As clearly shown in Fig. 3, the two opposed compression springs 38 act oppositely to normally locate the spherical valve member 42 in the centrally disposed position illustrated.

It should be noted that the end of the conduit 22 is threaded into the upper part of the lockout housing as at 44 and communicates with the chamber or passage 27 by means of lateral passageway 46 communicating at its extremities with vertical passageways 48. In other words, the flow of hydraulic fluid through the line 22 branches at the passage 46 into the passages 48 on either side of the movable valve member 42 from whence the flow continues outwardly of the respective fittings 32 and into the respective branch lines 26 to coincidentally actuate both brake assemblies 20. While the passages 46 and 48 may be provided in accordance with any conventional practice, it will be obvious that in the embodiment shown these passages have been formed by boring or drilling, and threaded plugs 50 and 52 function to seal the otherwise outwardly communicating extremities of the drilled passages.

The operation of the foregoing construction is as follows: The pilot desiring to reduce the speed of the air craft on the ground actuates his brake pedals, supplying brake fluid under high pressure through the conduit 22, the supply branching at 46 to the conduits 48 and passing through branched conduits 26 and the flexible conduits 28 to apply both brakes. Let it be assumed that during or just prior to this operation one of the flexible members 28 has been loosened or torn away by repeated impacts or by some projecting object, thus opening one of the conduits 26. If the line so affected happens to be the one viewed in the right-hand side of Fig. 2, then the sphere 42 moves instantaneously into the position shown in Fig. 4 to positively close and seal off the right-hand line 46, as clearly illustrated in Fig. 4. Equivalent action of the device in the event of failure of the opposite brake assembly is illustrated in Fig. 5.

Attention is particularly directed to the fact that in the preferred embodiment of the present invention the spherical member 42 is formed of some suitable elastic or resilient material, such as rubber or equivalent natural and synthetic substitutes.

The opposite brake assembly obviously continues to operate in a normal manner, the air craft being brought to a safe stop. The sphere, under the influence of the high pressure of operation, becomes permanently sealed into interlocking relationship with the valve seat or port 40. In other words, the resilient rubber spherical member 42, when subjected to the high pressures prevailing in the brake system, becomes reduced in diameter and permanently interlocks therewith. Thus, when the pressure is released, the defective port remains permanently sealed.

The present invention provides a very simple and surprisingly compact unit which may be fastened to the under side of the forked struts 18 by any suitable fastening means 54. The construction is so relatively minute in form as to be applicable in the relationship shown to substantially any vehicle. The present construction operates positively and permanently as intended in spite of its orientation in space. While this is an obviously critical factor in connection with use in air craft and particularly on shiftable landing gear constructions, it is also of important significance in relation to its use with moving vehicles in general. It is of even greater significance to note, however, that the present device is operative as intended in spite of wide relative variations in the flow of hydraulic fluid to the respective branch conduits 26. It has been definitely determined and established that the valve member 42 will not operate as a lockout, in spite of a relatively inordinately wide disparity in the flow to the several lines. It will be realized that this is of extreme importance since the prior known lockout constructions quite frequently did operate to lockout a properly operating brake line simply because this line, due to constant usage, demanded substantially increased operating flow over another line which, for example, might have been recently overhauled. The significance of a solution of this problem should be at once apparent to those cognizant of the prime necessity for infallible operation of a safety device of the present class.

The present invention additionally provides a construction which need not be carefully proportioned in accordance with the characteristics of each and every hydraulic system, as was necessary in accordance with previous constructions, of which I am aware.

Attention is particularly directed to the fact, however, that all of the foregoing novel results obtain without interfering with the positive instantaneous response which occurs in the event of a brake failure. Thus, in action the lockout action valve member 42 has been determined by numerous tests to be so rapid that the norfinal operation of the retained brake member is not even measurably instantaneously affected.

Changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A hydraulic lockout device comprising a chamber having a plurality of spaced valve ports, a valve element resiliently biased to a point intermediate of said plurality of valve ports, and means for introducing pressure transmitting fluid on either side of said valve means for flow past both of said valve ports, said valve element comprising a member of resilient yieldable material engageable into said ports in permanently sealing relationship.

2. A hydraulic lockout device comprising a chamber having a plurality of spaced valve ports, a valve element resiliently biased to a point intermediate of said plurality of valve ports, and means for introducing pressure transmitting fluid on either side of said valve means for flow past both of said valve ports, said valve biasing means comprising resilient means oppositely acting upon said valve member and resisting the movement of said valve member toward either of said ports, said resilient means permitting the valve member to engage with either of said ports under the influence of a substantial force, said valve element comprising a member of resilient yieldable material engageable into said ports in permanently sealing relationship.

3. A hydraulic lockout device of the class described comprising a chamber having a plurality of spaced valve ports, a valve member occupying a substantial portion of said chamber movably disposed within said chamber at a point intermediate of said valve ports, resilient means oppositely biasing said valve means to said intermediate position, and inlet means for pressure transmitting fluid, said inlet means being constructed and arranged to supply fluid to said chamber on either side of said valve means, said valve member comprising a member of resilient yieldable material engageable into said ports in permanently sealing relationship.

4. A hydraulic lockout device of the class described comprising a chamber having a plurality of spaced valve ports, a valve member occupying a substantial portion of said chamber movably disposed within said chamber at a point intermediate of said valve ports, resilient means oppositely biasing said valve means to said intermediate position, and inlet means for pressure transmitting fluid, said inlet means being constructed and arranged to supply fluid to said chamber on either side of said valve means, said biasing means being sufficiently resilient to permit the valve member to move to either port under a moderate force while holding said valve member substantially at said intermediate biased position under all forces resulting from the mass of the valve member, said valve member comprising a member of resilient yieldable material engageable into said ports in permanently sealing relationship.

5. A hydraulic lockout device of the class described comprising a chamber having a plurality of spaced valve ports, a valve member occupying a substantial portion of said chamber movably disposed within said chamber at a point intermediate of said valve ports, resilient means oppositely biasing said valve means to said intermediate position, and inlet means for pressure transmitting fluid, said inlet means being constructed and arranged to supply fluid to said chamber on either side of said valve means, said biasing means being constructed and arranged to resiliently resist movement of said valve means to any one of said valve ports, said valve member comprising a member of resilient yieldable material engageable into said ports in permanently sealing relationship.

6. A hydraulic lockout device of the class described comprising a chamber having a plurality of spaced valve ports, a valve member occupying a substantial portion of said chamber movably disposed within said chamber at a point intermediate of said valve ports, resilient means oppositely biasing said valve means to said intermediate position, and inlet means being constructed and arranged to supply fluid to said chamber on either side of said valve means, said biasing means comprising resilient compression members acting on lines extending substantially between said valve member and each of said ports, whereby to increasingly and resiliently resist movement of said valve member to any one of said valve ports, said valve member comprising a member of resilient yieldable material engageable into said ports in permanently sealing relationship.

7. A hydraulic lockout device of the class described comprising a chamber having a plurality of spaced valve ports, a valve member occupying a substantial portion of said chamber movably disposed within said chamber at a point intermediate of said valve ports, resilient means oppositely biasing said valve means to said intermediate position, and inlet means for pressure transmitting fluid, said inlet means being constructed and arranged to supply fluid to said chamber on either side of said valve means, said chamber comprising a longitudinally extending guideway for said valve member and said valve ports being longitudinally disposed with respect to said guideway, said valve member comprising a member of resilient yieldable material engageable into said ports in permanently sealing relationship.

8. A hydraulic lockout device of the class described comprising an elongated cylindrical chamber having an axis residing in a straight line, a valve port axially disposed adjacent either end of said chamber and having outlet conduit receiving means associated therewith, an axially shiftable valve member disposed in said chamber for movement longitudinally thereof for cooperative sealing engagement with said valve ports, said valve member occupying a substantially sectional proportion of said chamber, and axially disposed spring members resiliently oppositely biasing said valve member to a point intermediately located between said ports, and inlet means for pressure transmitting fluid and communicating with said chamber on either side of the normal location of said valve member for supplying hydraulic pressure fluid to both of said conduits, said valve member comprising a sphere of resilient yieldable material having a diameter normally larger than the diameter of said ports and operative under pressure within the system to be compressed in diameter and to enter the port in permanent sealing relation when failure occurs.

9. A lockout device for a fluid pressure system, comprising a chamber having at least one valve port means, a valve means resiliently biased to a point spaced away from said valve port means, and means for introducing pressure transmitting fluid on either side of said valve means for flow toward said valve port means, at least one of said means comprising a member formed of resilient yieldable material operatively interengageable with the other means in permanently sealing relationship.

10. A hydraulic lockout device comprising a chamber having a plurality of spaced valve ports providing an outlet means, a valve means resiliently biased to a point intermediate of said plurality of ports, and means for introducing pressure transmitting fluid on either side of said valve means for flow past both of said valve ports, at least one of said means comprising a member of resilient yieldable material operatively interengageable with said other means in permanently sealing relationship.

CLAYTON B. SEYMOUR.